Patented Apr. 23, 1935

1,998,667

UNITED STATES PATENT OFFICE 1,998,667

METHOD OF MANUFACTURE OF A PLASTIC MATERIAL, CAPABLE OF BEING HARDENED

Helmut Fritz, Mauer, and Emil Glaser, Vienna, Austria

No Drawing. Application January 23, 1933, Serial No. 653,172. In Austria February 6, 1932

11 Claims.  (Cl. 106—24)

The present invention relates to a method of manufacturing a plastic material, which when protected from moisture can be stored for subsequent use for an indefinite period. This material hardens only in contact with water in liquid or vapor form, the time of hardening depending upon the composition of the materials used. The material is applicable to various purposes such as to works of applied art, tightenings or filling material, temporary tooth fillings, weather proof paint, plaster or the like, especially in those cases in which in practice, a high degree of plasticity is required as well as a control of the period of setting or hardening.

It is known that certain metallic salts such as calcined gypsum in certain combinations form cements or the like which set when mixed with water, that is harden and produce materials more or less firm and resistant, according to the mixture selected. The materials have the disadvantage for some practical purposes of either hardening too quickly or too slowly, or of showing undesired efflorescence. Often too, they are too soft, or have little resistance to water or other agents, or, have a low degree of plasticity which renders them unsuitable for modelling. In such cases it is necessary to employ an experienced operator to prevent defective production.

It is of great importance in practice to have plastic materials like the above in such a condition that they are always ready for use, that is mixed to the correct plastic consistency. The materials must also be of such a nature that they will harden and set in a predetermined time. They should also be capable of being stored for long periods of time without undergoing deleterious transformations. In addition they preferably should not require a mixing with water before use or the services of an expert operator to be successfully utilized. It is the object of this invention to provide plastic materials possessing these characteristics.

According to this invention plastic materials which are capable of being hardened by the influence of moisture in liquid or vapor form are produced by intimately mixing together hydraulic binders, hygroscopic substances and dispersing or plasticizing agents anhydrous or nearly anhydrous liquid compounds which are soluble in water or miscible with water to produce a homogeneous mass which has the required consistency and which will remain in the plastic state as long as moisture is excluded therefrom.

The usual hydraulic binding materials may be utilized in forming our compositions. Thus cements like Portland, Roman, oxychloride and the like, and other agents such as gypsum and the like are eminently suitable for use.

Any organic liquid which possesses solvent properties and can readily be obtained in an anhydrous or substantially anhydrous state may be employed as the plasticizing or dispersing agent. As suitable dispersing agents may be mentioned mono- or polyhydric alcohols such as the lower molecular weight monohydric alcohols like ethyl and polyhydric alcohols like glycol and glycerine; esters of such alcohols with organic or inorganic acids, such as the acetines (acetic acid esters of glycerine) glycoldiacetate, ethylformate, ethylacetate and silicontetraethyl; halogenated derivates of such alcohols as the chlorhydrines, i. e. dichlorhydrin and ethers such as ether and sulfuric ether.

Various hygroscopic compounds may be employed with good results. Thus one may use hygroscopic metal salts as for example the chlorides of zinc, magnesium calcium and the like. On the other hand, the plasticizing or dispersing agent employed may serve as the hygroscopic substance and this is particularly true when employing liquids like glycol and glycerine monoacetate as the dispersing medium.

The components of the plastic materials of this invention may be worked up into a plastic mass in various ways. According to one method one or more components of the material capable of being hardened, are mixed or worked up in a powdered or a colloidal state, with a solution which may be a colloidal solution such as an organosol, of several or at least one of the components which are necessary to form the the aforesaid material capable of being hardened, in a solvent which is as free as possible of water. The required degree of plasticity is obtained by regulating the amount of the solvent or the concentration of the partly dissolved components.

By the use of this method the powdery component or components is or are entirely and uniformly mixed with the other components, whereby the whole is brought into the most favorable condition for the subsequent hardening.

According to another embodiment all components of the plastic material are insoluble in the anhydrous liquid employed but this method does not produce such good results as the one hereinbefore described especially with respect to quick setting.

The anhydrous or nearly anhydrous liquid dispersing agent which effects the desired consistency of the plastic material, has of course to be adapted for the intended purpose. The choice of the most suitable liquid is determined by the properties desired in the plastic material. Should a plastic material be required having a comparatively long hardening time, compounds with a high boiling point such as glycol diacetate, acetin (mono-acetin, di-acetin, or tri-acetin or mixtures thereof), dichlorhydrin or the like are employed as anhydrous liquids. Should a comparatively short hardening time be required, then anhydrous or nearly anhydrous liquids with a boiling point as low as possible, such as ethyl formate, ethyl acetate, ether and the like, are employed. In certain cases, however, it is necessary to take into consideration the vapor pressure of the compounds which are selected as the anhydrous liquids. Generally compounds with a medium or high vapor pressure are preferred.

The plastic materials described before become permanently hard after treatment with water. The time which is required for the hardening can be controlled by the composition of the plastic material.

The employment of the hygroscopic substance or substances in the plastic material during its manufacture automatically provides in the correct proportion, the water which is necessary for an efficient hardening. When a special treatment of the material with water is required these compounds absorb and distribute the water quickly and uniformly. When using as the hygroscopic agent strongly hygroscopic chemical compounds such as certain metal chlorides, for example calcium chloride, magnesium chloride or the like, they are mixed in solution with the anhydrous liquid or in powder form with the powdered components. It is advantageous however, to mix these hygroscopic substances in the form of a solution with the powder-like component of the material capable of being hardened, because the distribution in the plastic material is very suitable for the purpose of providing an automatic water supplying medium. Thereby mobile liquids such as the lower alcohols, ether or the like may be rendered viscous. At the same time the hygroscopic substance, such as zinc chloride, may also provide a component of the hydraulic binder such as an oxychloride cement whereby the composition of the plastic material is simplified.

In some cases the use of an addition compound of a metallic salt with an anhydrous organic liquid, which salt decomposes into its components in the presence of water, is advantageous. As such an addition compound, one may use the addition compound of ether and zinc chloride either alone or in admixture with ether per se or other anhydrous liquids. If such addition compounds be employed, it is often advisable in order to accelerate their decomposition, to add to the mixture a catalyst for effecting such decomposition. Powdered magnesium answers this purpose in a satisfactory manner.

The following examples, in which parts by weight are given, serve to describe various satisfactory compositions according to this invention. It is to be understood, however, that the invention is not limited to these specific examples.

Example I 50 parts of magnesium oxide
20 parts of zinc sulphate
30 parts of saturated ethereal solution of magnesium chloride.

Example II 45 parts of zinc oxide
20 parts of zinc sulphate
15 parts of mono-acetin
20 parts of dichlorhydrin.

Example III 53 parts of magnesium oxide
17 parts of silicon tetra-ethyl
30 parts of saturated alcoholic solution of calcium chloride.

Example IV 75 parts of calcined gypsum
25 parts of 20% alcoholic solution of calcium chloride.

Example V 72.5 parts of Portland cement
27.2 parts of 40% alcoholic solution of zinc chloride.

Example VI 65 parts of zinc oxide
5 parts of aluminium sulphate
30 parts of alcoholic aluminium chloride solution.

The foregoing examples illustrate how the composition and consequently the properties (time of setting and hardening, plasticity, resistance against water, gas and the like) of the plastic material of this invention may be varied. The particular advantage of the plastic material manufactured according to this invention is that it is capable of being stored for an indefinite time without deterioration, while at the same time it is always in a condition for immediate use if correctly stored. It is impossible to produce defective work with the plastic materials which are made with the materials according to this invention, as they function automatically in consequence of their composition.

We claim:

1. Process for producing a plastic material capable of being hardened by the influence of water in the liquid or vapor form which comprises intimately mixing in the absence of water a hydraulic binder, a hygroscopic substance and an anhydrous liquid organic compound to produce a homogeneous mass of the desired consistency.

2. The process as defined in claim 1, wherein one of the solid components is in the form of a powder and the other solid component is dispersed in an anhydrous organic liquid.

3. The process as defined in claim 1 wherein an anhydrous organic liquid is selected which has a boiling point and vapor pressure such as to provide the desired time of setting of the material.

4. A plastic composition capable of being hardened under the influence of water essentially comprising a hydraulic binding agent, a hygroscopic substance and an anhydrous organic liquid plasticizing medium.

5. A composition as defined in claim 4 wherein the anhydrous organic liquid is selected from the class consisting of alcohols, esters thereof, chlorhydrines and ethers.

6. A composition as defined in claim 4, wherein the hygroscopic substance is a metallic chloride and the anhydrous organic liquid is selected from the class consisting of alcohols, esters thereof, chlorhydrines and ethers.

7. A composition as defined in claim 4, wherein the hygroscopic substance is zinc chloride which substance also serves as a hydraulic binder.

8. A plastic composition capable of setting under the influence of water comprising a hydraulic binding agent, a hygroscopic metal chloride and anhydrous dichlorhydrin.

9. A plastic composition capable of setting under the influence of water comprising a hydraulic binding agent, a hygroscopic metal chloride and anhydrous glycerine mono-acetate.

10. A plastic composition capable of hardening under the influence of water comprising a hydraulic binding agent, and an addition compound of zinc chloride and ether capable of decomposing in the presence of water into zinc chloride and ether.

11. A composition as in claim 10, including powdered magnesium which catalyzes the decomposition of said addition compound.

HELMUT FRITZ.
EMIL GLASER.